United States Patent
Peters et al.

(10) Patent No.: US 7,539,687 B2
(45) Date of Patent: May 26, 2009

(54) PRIORITY BINDING

(75) Inventors: Ted Andrew Peters, Bellingham, WA (US); Kenneth Bruce Cooper, Seattle, WA (US); Samuel W. Bent, Bellevue, WA (US); Namita Gupta, Seattle, WA (US); David J. Jenni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 10/823,461

(22) Filed: Apr. 13, 2004

(65) Prior Publication Data

US 2005/0228801 A1 Oct. 13, 2005

(51) Int. Cl.
G06F 17/30 (2006.01)

(52) U.S. Cl. .................. 707/100; 707/102; 707/203

(58) Field of Classification Search ............. 707/2–5, 707/100, 103 R–103 Z, 104.1, 7, 102, 103; 717/100, 109, 165; 715/700
See application file for complete search history.

(56) References Cited

U.S. PATENT DOCUMENTS

| | | | | |
|---|---|---|---|---|
| 5,083,262 | A | 1/1992 | Haff, Jr. ..................... | 703/27 |
| 5,255,356 | A | 10/1993 | Michelman et al. ......... | 395/148 |
| 5,388,196 | A | 2/1995 | Pajak et al. ................. | 395/153 |
| 5,396,587 | A | 3/1995 | Reed et al. .................. | 395/145 |
| 5,452,459 | A | 9/1995 | Frury et al. ................. | 395/700 |
| 5,485,617 | A | 1/1996 | Stutz et al. .................. | 395/700 |
| 5,581,760 | A | 12/1996 | Atkinson et al. ............ | 395/700 |
| 5,706,505 | A | 1/1998 | Fraley et al. ................ | 395/614 |
| 5,835,904 | A | 11/1998 | Vicik et al. .................... | 707/1 |
| 6,023,271 | A | 2/2000 | Quaeler-Bock et al. ..... | 345/335 |
| 6,167,455 | A | 12/2000 | Friedman et al. ............ | 719/320 |
| 6,262,729 | B1 * | 7/2001 | Marcos et al. .............. | 715/744 |
| 6,330,006 | B1 * | 12/2001 | Goodisman ................. | 715/762 |
| 6,378,004 | B1 | 4/2002 | Galloway et al. ........... | 709/321 |
| 6,401,099 | B1 | 6/2002 | Koppolu et al. ............. | 707/103 |
| 6,429,882 | B1 | 8/2002 | Abdelnur et al. ............ | 715/763 |
| 6,438,618 | B1 | 8/2002 | Lortz et al. ................. | 709/318 |
| 6,463,442 | B1 | 10/2002 | Bent et al. .................. | 707/103 |
| 6,571,253 | B1 | 5/2003 | Thompson et al. .......... | 707/103 |
| 6,826,759 | B2 | 11/2004 | Calder et al. ................ | 719/328 |
| 2001/0042140 | A1 | 11/2001 | Calder et al. ................ | 719/328 |
| 2002/0026447 | A1 | 2/2002 | Matsutsuka et al. ...... | 707/103 Y |
| 2003/0035003 | A1 | 2/2003 | Marcos et al. .............. | 715/760 |
| 2004/0230911 | A1 * | 11/2004 | Bent et al. .................. | 715/762 |
| 2005/0060351 | A1 * | 3/2005 | Rahman ................... | 707/104.1 |

(Continued)

OTHER PUBLICATIONS

Balena, F., "Introducing Visual Basic 6, Learn the Major New Features of VB6", *Visual Basic Programmers Journal*, 1998, 28-31, 34-40, 42,44,46-47.

(Continued)

*Primary Examiner*—Cheryl Lewis
(74) *Attorney, Agent, or Firm*—Woodcock Washburn LLP

(57) ABSTRACT

Priority binding enables a one-to-many mapping of a target to a source without requiring complex code development by the specification of one or more binding statements. During runtime, these bindings are evaluated. The highest priority binding that evaluates successfully is executed, controlling the two-way transfer of information between source and target. During execution, all possible data binding pathways are monitored. If a binding that has a higher priority than the existing binding evaluates successfully, the existing binding is terminated and the new binding is executed.

36 Claims, 9 Drawing Sheets

U.S. PATENT DOCUMENTS

2005/0091287 A1* 4/2005 Sedlar .................. 707/200
2005/0160107 A1* 7/2005 Liang .................. 707/100

OTHER PUBLICATIONS

Dobson, R., "Data Binding in Dynamic HTML", *DBMS*, Mar. 1998, 47-48, 50-52.

Dobson, R., Dynamic HTML Explained, Part III, *Byte*, 1998, 43-44.

Verstak, A., "BSML: A Binding Schema Markup Language for Data Interchange in Problem Solving Environments", *Scientific Programming*, 2003, 11, 199-224.

Thimbleby, H., "View Binding and User Enhanceable Systems", *The Visual Computer*, 1994, 10(6), 337-349.

Gamma, et al., "Elements of Reusable Object-Oriented Software", *Design Patterns*, 1995, 223-232, XP-002280623.

* cited by examiner

PRIORITY BINDING

CROSS-REFERENCE TO RELATED APPLICATIONS

The application is related to patent application Ser. No. 10/822910 entitled "APPLICATION OF A DATA-BINDING MECHANISM TO PERFORM COMMAND BINDING", filed herewith.

FIELD OF THE INVENTION

The invention relates to computing and in particular to mapping a target to a number of data elements via a priority binding technique.

BACKGROUND OF THE INVENTION

The task of designing a user interface (UI) for a software application is tedious and time-consuming. Developers typically spend a great deal of time writing code to transfer information from the underlying data of the application to the elements or components of the UI and back again. Not only does this consume developer time, it also means that a developer is required to be heavily involved in UI design. As UIs have become more visually sophisticated, it has become increasingly important to have professional designers build UIs rather than developers. But, because code is still required to "hook up" the interface to the underlying data, the task of UI design must be shared between developer and designer.

It would be helpful if there were an easy and flexible way to hook up an interface to the underlying data.

SUMMARY OF THE INVENTION

A system and method for priority binding enables a UI to be defined declaratively, without the need for data connection code. The declarative specification of a one-to-many mapping of a UI element to one or more underlying data elements in a UI specification enables sophisticated UIs to be built without requiring complex code development. A list of bindings and a priority order are provided. During runtime, these bindings are evaluated. The highest priority binding that evaluates to a valid result (i.e., evaluates successfully) is executed, controlling the transfer of information between the UI and the underlying data. While the UI is executing, all possible data binding pathways are monitored. If a binding that has a higher priority than the existing binding evaluates successfully, the existing binding is terminated and the new binding is executed.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
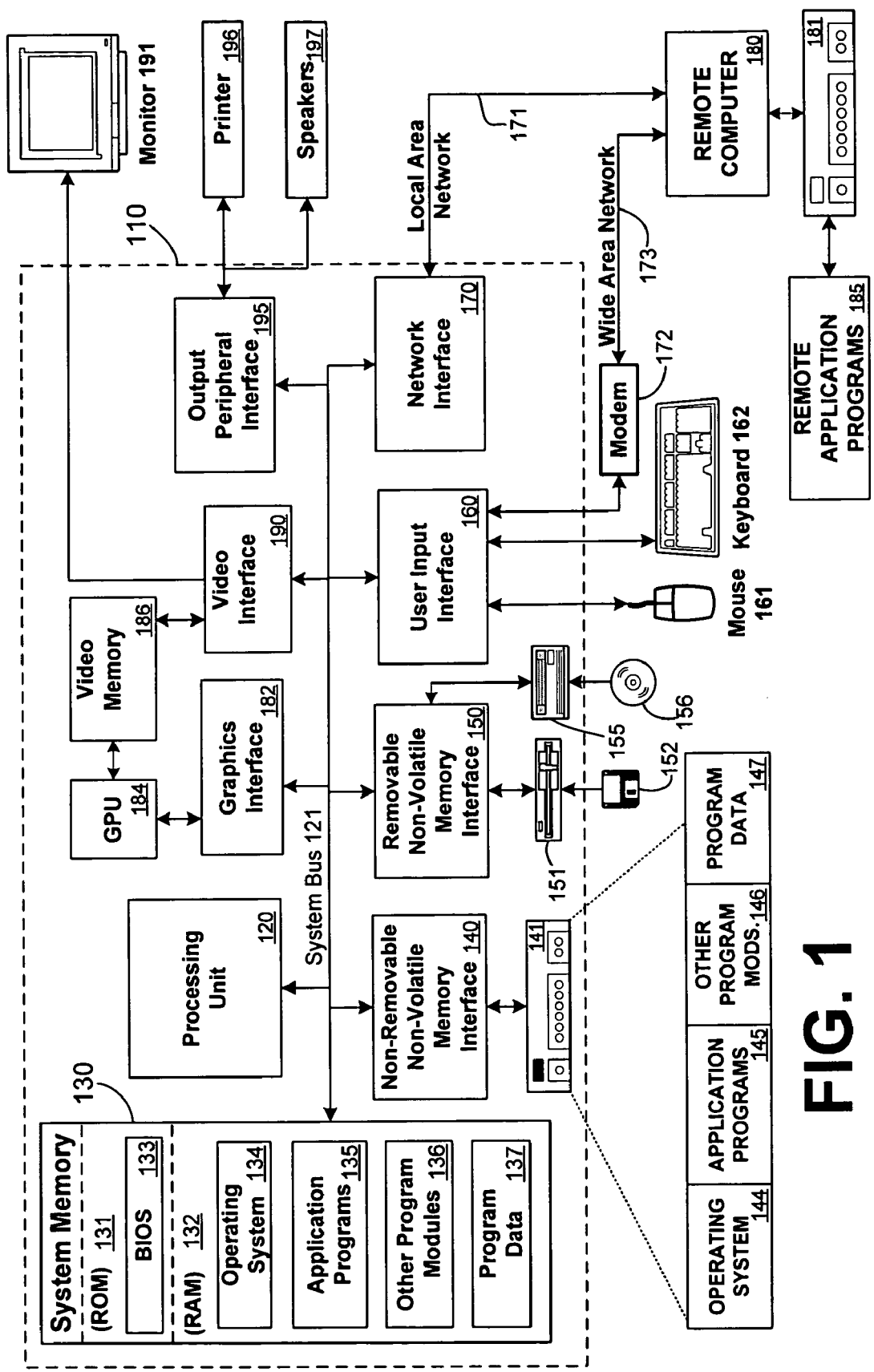
FIG. 1 is a block diagram showing an exemplary computing environment in which aspects of the invention may be implemented.

To eliminate the coding necessary to "hook up" UI elements or components to the underlying data, a feature commonly referred to as "data binding" enables designers to declaratively describe the connection between the underlying data and the UI. By describing the connection of a UI element or component such as a Text Box, for example, with a piece of data (i.e., a number or count of employees), the platform may then be able to automatically handle the process of moving the data into and out of the UI. For example, data binding may be invoked by a statement such as:

Text.TextContent=Bind("Employees.Count");

which would display the number of employees (i.e., the state of the model) in a text box on a UI. Two-way binding enables changes in the target to be reflected in the model, as well. For example, the following statement invokes two-way binding:

CheckBox.IsChecked=Bind("Employee.IsMarried");

In the above, a change made to the check state would be reflected immediately in the Employee model, in addition to displaying the state of the model.

The drawback with this approach is its rigidity. For example, a single UI element might be connected to multiple data elements, as, for example, might occur in a status or help text display in a UI. The status text might show different messages depending on other state in the UI. To demonstrate, if an item of a list of items is selected, the status text might show information about the selected item. If nothing is selected, the text might show information about the entire list (for example, the text may display the number of items in the list).

Using code, a developer can describe more sophisticated connections between the data and the UI than the one-to-one data mapping that is done with conventional data binding, but this approach presents the problems discussed above with respect to the necessity of having both a designer and a developer involved in the development of a UI.

The present invention addresses these and other issues by extending the one-to-one mapping with a system and method that is more flexible, allowing designers to describe more sophisticated UIs without requiring the involvement of developers. With this approach, a single UI is not bound to only a single data element, but instead, a list of bindings and a priority order may be provided. In some embodiments, priority is indicated by the order in which the statements appear (i.e., a sequence of appearance of the statements in the code or markup) Alternatively, a collection of binding statements and an indication of the order in which the bindings are to be evaluated and/or executed (such as, for example, by a priority indicator associated with the binding statement) may be provided. When the UI element is instantiated during runtime, these bindings are evaluated, and if the particular data element identified by the data binding statement exists (i.e., the statement evaluates successfully), then that binding becomes live and controls the transfer of data between the UI and the underlying data.

Over the lifetime of the UI, if any of the state referred to in the list of data elements changes, then the data binding engine re-evaluates the list of bindings, again searching for the highest priority valid binding. The highest priority valid binding is executed. Suppose the following statement describes the above example:

StatusTextLabel.Text.Bindings.Add("Employees.SelectedItem.Name");
StatusTextLabel.Text.Bindings.Add("Employees.Count");

At binding evaluation time, the data binding engine in some embodiments of the invention, will first examine the first binding. If the expression:

"Employees.SelectedItem.Name"

can be successfully evaluated, then that binding is valid, and the data binding engine will make the binding live, copying data into the status text label as required. If the statement does not evaluate successfully, either because there is no current data named "Employees" or because there is no currently selected item in the data or because the SelectedItem does not have a property "Name", the first binding is not executed and the next one is evaluated. If that binding is valid, it is executed. If none of the bindings are valid, then no binding is executed and no data is copied to or from the UI element.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Performing Priority Data Binding

Figure 2:
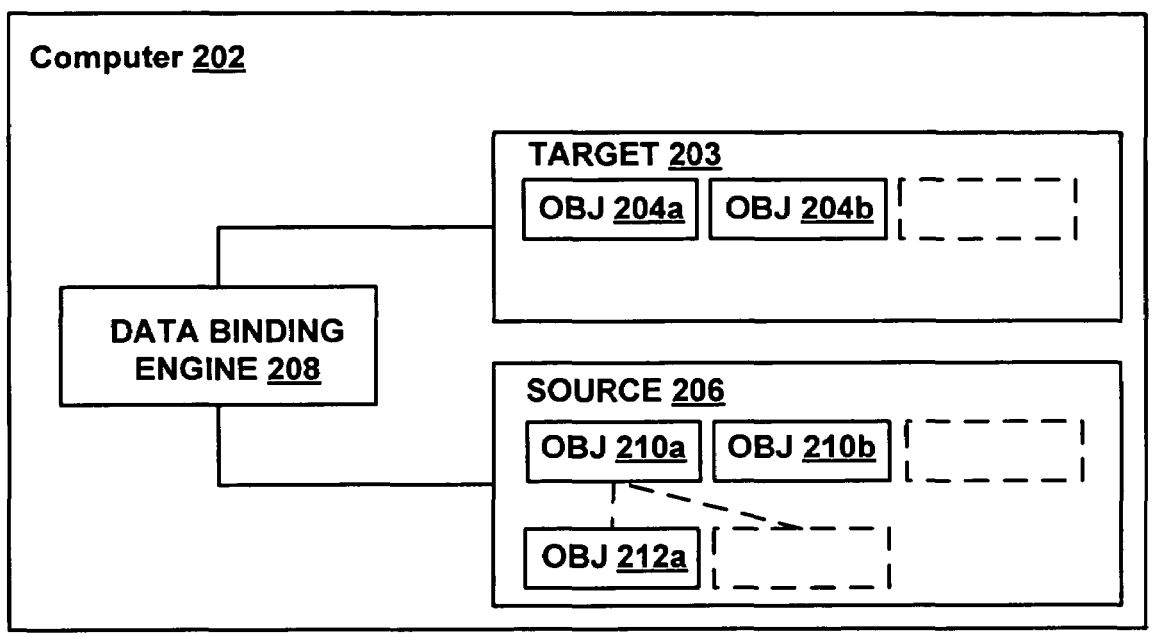
FIG. 2 is a block diagram of an exemplary system for performing priority bindings in accordance with one embodiment of the invention.

FIG. 2 illustrates an exemplary system for performing priority binding in accordance with some embodiments of the invention. Such a system may reside in whole or in part on one or more computers, such as exemplary computer 202 of FIG. 2. Computer 202 may comprise a computer such as computer 110 described with respect to FIG. 1. A system for performing priority binding may comprise one or more of the following elements: a data-binding component 208, a source 206, and/or a target 203.

Source 206 may include one or more source objects as represented by source objects 210a, 210b, etc. Source objects 210a, 210b, etc. may be associated with one or more child source objects, represented in FIG. 2 by source object 212a, etc. In some embodiments of the invention, source 206 may represent a model. A model in some embodiments of the invention is the underlying application logic representing a collection of underlying state.

For example, consider an application that enables a user to explore the file system. The model for the application in this case may be a file system: the set of folders and files within the folders of a selected directory. A number of views may be bound to one model. The views bound to the model may be dependent on the model. In some embodiments of the invention, however, the model is not dependent on the view or views. A model may send a change notification if a property on one of its objects changes or if a change in state occurs. For example, if a new file is added to a folder, a change notification may be sent.

Target 203 may include one or more target objects as represented in FIG. 2 by target objects 204a, 204b, etc. Target objects 204a, 204b, etc. may be associated with one or more child target objects (not shown). In some embodiments of the invention, the target may be a view or user interface. One or more views may be bound to a model and display the state of the underlying model. In some embodiments of the invention, a view or user interface is defined in a markup language such as HTML (hypertext markup language, XML (eXtensible Markup Language), XAML (eXtensible Application Markup Language) or other suitable markup language, in which the look of the user interface is defined and the elements or components of the user interface are defined. A target object may be a user interface element or control such as but not limited to a menu item, button, text control or list box. In the file system example described above, an exemplary user interface may display the list of files in the currently selected folder.

To bind the target to the source (e.g., the user interface to the underlying model), in some embodiments of the invention, instead of explicitly defining the binding through code that maintains the relationship between the user interface and underlying model using an event handler, the object representing the user interface component is bound to the underlying model object by specifying a data source and a binding path, such as but not limited to a query path. If any part of the query changes, a change notification is sent by the object, and the priority data binding engine detects the change notification and updates the appropriate object(s). It will be appreciated that the subject that is being queried are live objects within a running program. In some embodiments of the invention, the data source referenced may be any type of data source such as but not limited to: an object specified by a URI (Uniform Resource Identifier), a database accessed via a database query, a program model and so on. The query path may be specified as an object path, as an XML XPath expression, and so on.

In some embodiments of the invention, data-binding component 208 is a priority data binding engine, that enables the dynamic binding of any of several source objects, (e.g., exemplary source objects 210a, 210b, etc., 212a, etc.) to a target object, (e.g., exemplary target objects 204a, 204b, etc.). The priority data binding engine 208 may listen to property change notifications on objects (such as objects 204a, 204b, etc., 210a, 210b, etc., 212a, etc.) so that a change to a source object is automatically reflected on the associated target object and vice versa. A target object may be associated with a data source, which may identify the source model to which the target object is bound. The priority data binding engine 208 may support property paths to enable the binding of specific parts of the target to specific parts of the source. In some embodiments of the invention, binding a target object to a source object may be done declaratively in a markup language such as HTML (HyperText Markup Language, XML (eXtensible Markup Language), XAML (extensible Application Markup Language) or other suitable markup language. The data binding engine 208 may search for the source object on the target object's data source and perform the appropriate updating and vice versa.

Figure 3A:
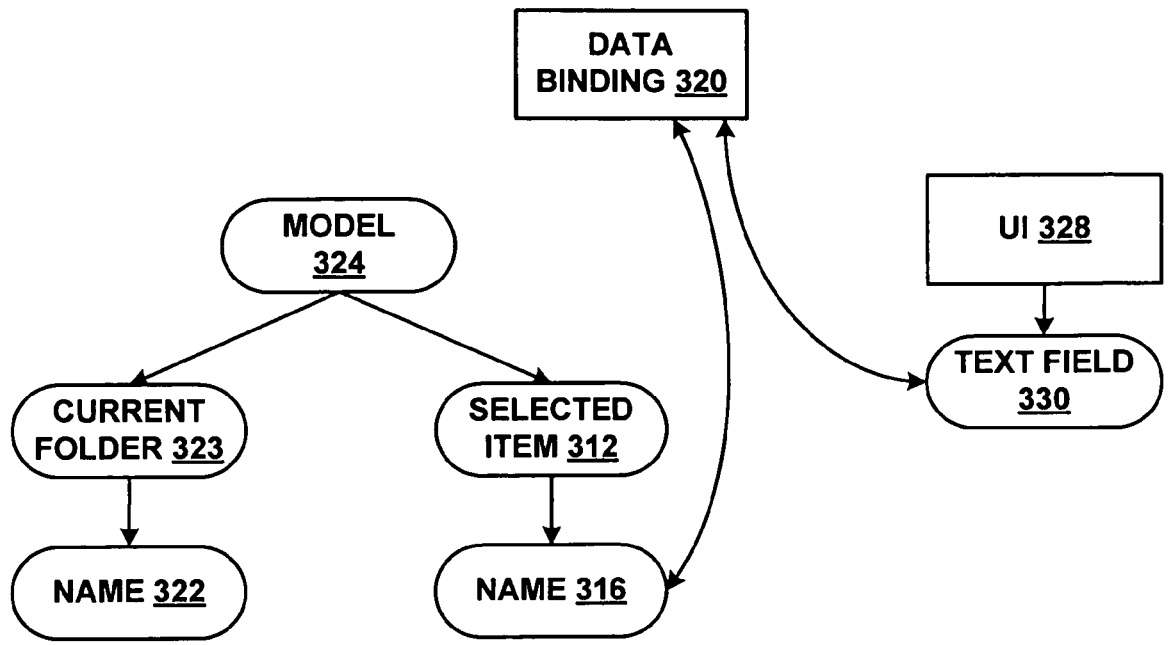
FIG. 3a is a more detailed diagram of FIG. 2 in accordance with one embodiment of the invention.
Figure 3B:
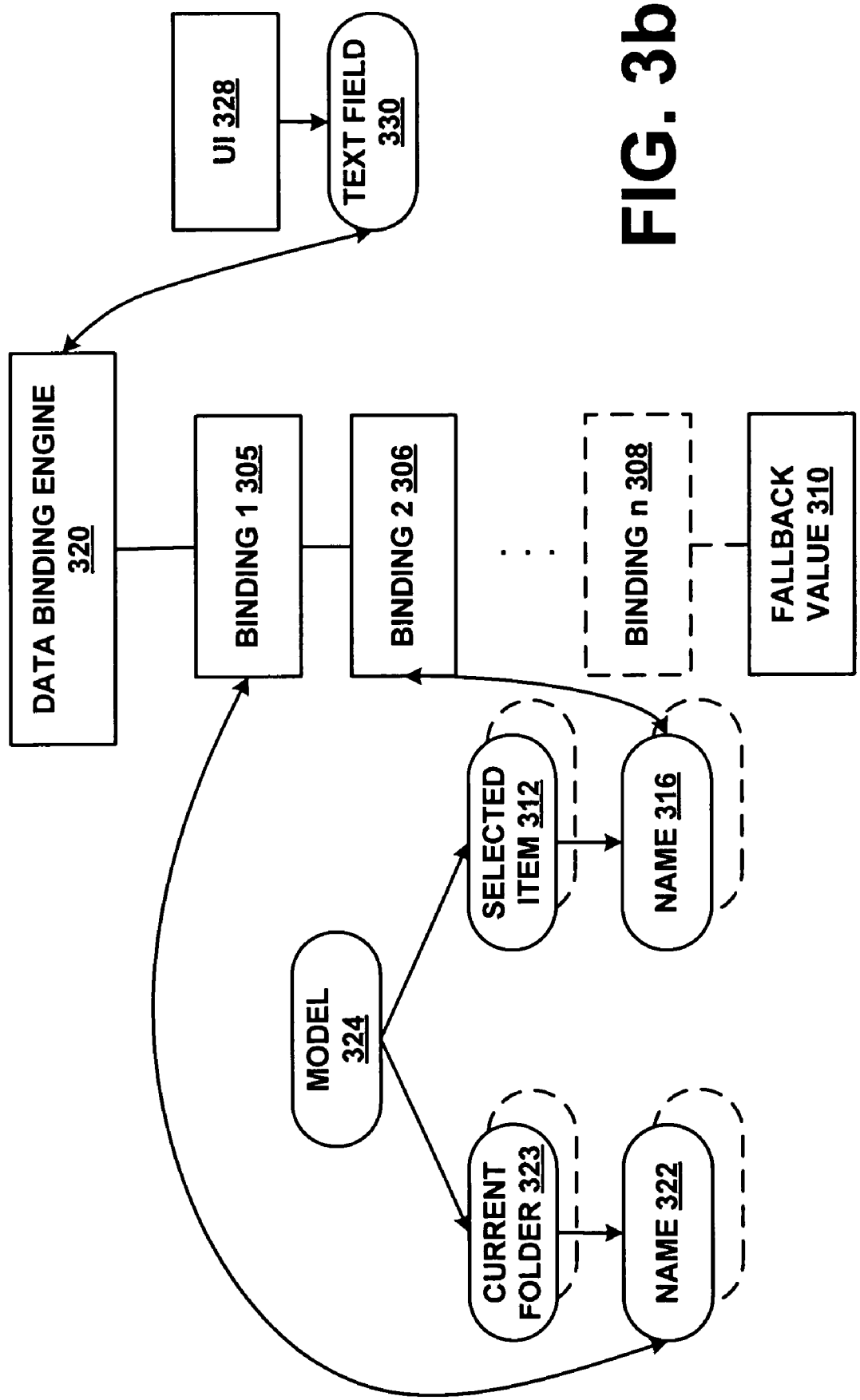
FIG. 3b is a more detailed diagram of FIG. 3a in accordance with one embodiment of the invention.

In some embodiments of the invention, a graph of object-oriented objects is generated where one, some, or all objects point to other objects, forming a graph, each arrow pointing from one object to another in the graph representing a property. An exemplary graph of object-oriented objects is illustrated in a portion of FIG. 3a. In FIGS. 3a and 3b, an example of a file system (files and folders) is presented. It will be apparent to those of skill in the art that the invention as contemplated is not limited to files and folders or the model to a file system explorer application, any appropriate subject capable of being represented as a data source and a hierarchy of properties, such as but not limited to objects in an object oriented programming language arena, is contemplated. In FIG. 3a, for example, object 324 may represent a file system explorer application (model), and objects 323 and 312 may represent folder and file objects within the file system. Objects 322 and 316 may represent name properties on the folder and file objects 323 and 312, respectively. In some embodiments of the invention, the priority data binding engine 208 enables the specification of a data source (such as object 324) and a property path (such as "CurrentFolder.Name") representing the path from the data source (object 324) to the object identified by the data path (object 323 to object 322). Thus, in the example, the priority data binding engine 208 can query into the object graph to determine which object is represented by the path "CurrentFolder.Name" (in this case, object 322), determine the content of the object 322 and update the target object specified (e.g., text field 330 of UI 328).

In FIG. 3a, the priority data binding engine 320 may bind a property 316 on a source object 312 (part of a model 324) to a property on a target object 330 (e.g., a UI component text field). The priority data binding engine 320 may listen to property change notifications (for example, if the name property 316 of a selected item object 312 of model 324 changed, a change notification may be sent by selected item object 312). Priority data binding engine 320 may listen for change notifications and upon detecting the change notification, synchronize the source and target (the UI element, text field 330) automatically.

FIG. 3b illustrates an exemplary priority binding system in accordance with some embodiments of the invention. In FIG. 3b, the model 324 comprises one or more objects, represented by objects 323 (current folder) and 312 (selected item) and exposes one or more properties (represented by name 322) for the current folder 323 and one or more properties (represented by name 316) for the selected item 312. A UI 328 includes one or more UI components, represented in FIG. 3b by text field 330. The specification of the UI 328 includes one or more binding statements, represented in FIG. 3b by binding 1 305, binding 2 306 . . . binding n 308 and fallback value 310 (optional). The content of the text field (displayed in the UI) may be bound to either the name of the current folder (object 322) or the name of the selected item (object 316). The data binding engine 320 in some embodiments of the invention, determines which of the bindings is to be executed and thus what content will be displayed in text field 330. One or more binding statements may be specified to be evaluated. The order in which the binding statements are presented may determine the priority, that is, the first statement presented may be the highest priority, and the second statement may be the next highest priority and so on, although it will be understood that any suitable means of identifying priority is contemplated. For example, priority may be indicated by an associated tag, by order of presentation in the markup (priority is in order from top to bottom or from bottom to top), alphabetically, or by any other suitable means. In FIG. 3b, the collection of binding statements include binding 1 305 and binding 2 306 although any number of bindings may be specified. In some embodiments of the invention, the order of evaluation of the statements is in priority order, although it will be understood that the binding statements may be evaluated in any order. In some embodiments of the invention, data binding engine 320 attempts first to evaluate binding 1 305. Suppose binding 1 305 is associated with name 322 of current folder 323. If binding 1 305 evaluates successfully, the name of the current folder will be displayed in text field 330. Suppose binding 2 306 is associated with name 316 of selected item 312. If binding 1 305 does not evaluate successfully, the data binding engine 320 attempts to evaluate binding 2 306. If binding 2 306 evaluates successfully, name 316 of selected item 312 will be displayed in text field 330. In addition, in some embodiments of the invention, a fallback value 310 may be specified. In this case, if neither binding 1 305 or binding 2 306 evaluates successfully, fallback value 310 may be displayed in text field 330. Thus the data binding engine 320 listens for change events, determines which of the collection of bindings is to be executed (i.e., which is the live binding) and updates the target (e.g., UI component) according to the currently live binding.

In some embodiments of the invention, the data binding engine continuously monitors all the objects for change notifications. If the data binding engine receives a change notification for a higher priority binding, that binding is evaluated, and if the binding evaluates successfully, the data binding engine executes the higher priority binding. Also, if the current binding becomes invalid, (for example, because no items are selected causing the selected item to become null), the whole expression no longer evaluates successfully and the data binding engine evaluates the collection of binding expressions again. The highest priority expression that evaluates correctly is executed and the display updated appropriately.

Figure 4A:
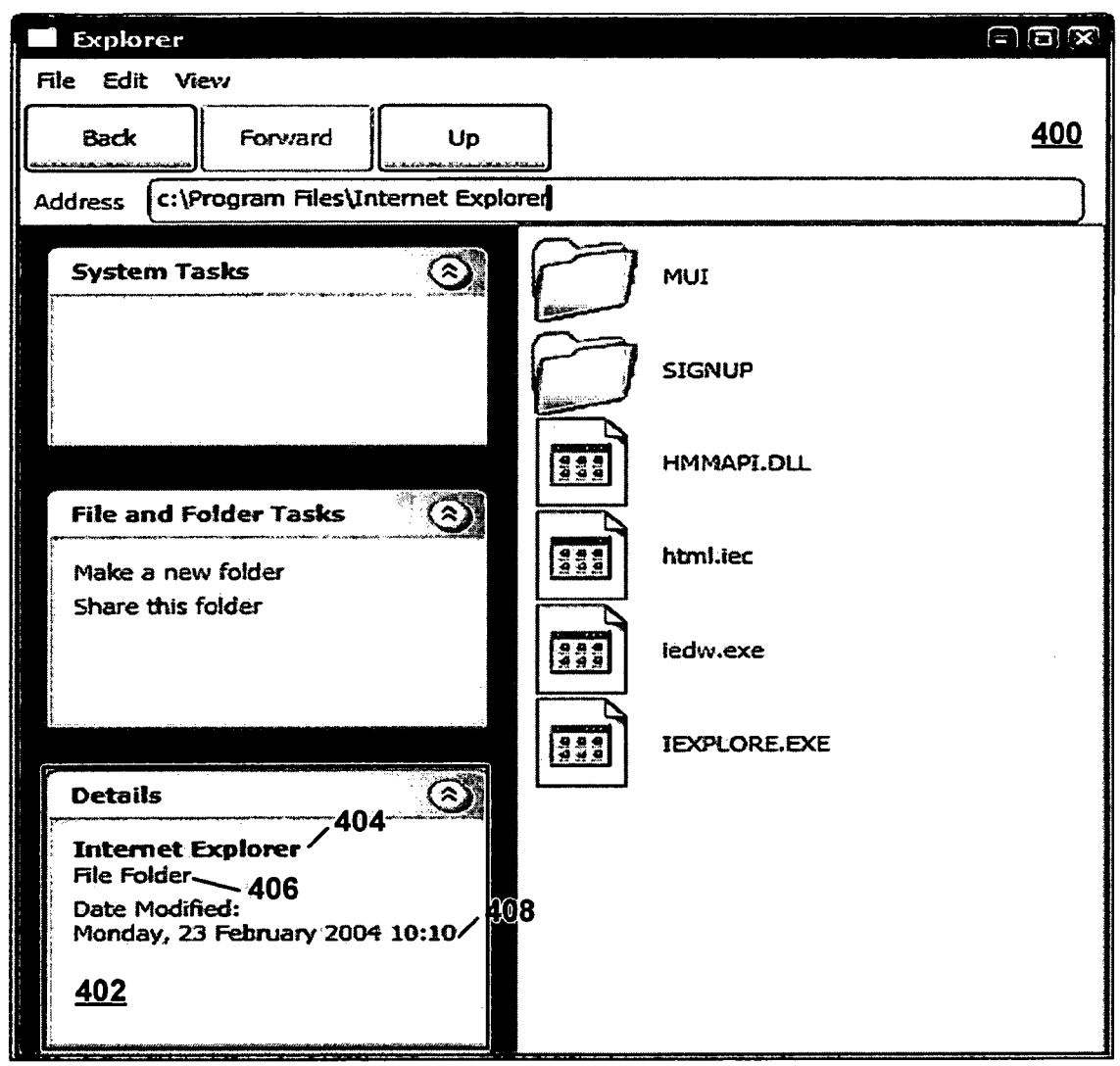
FIGS. 4a-c are exemplary user interfaces in accordance with one embodiment of the invention.
Figure 4B:
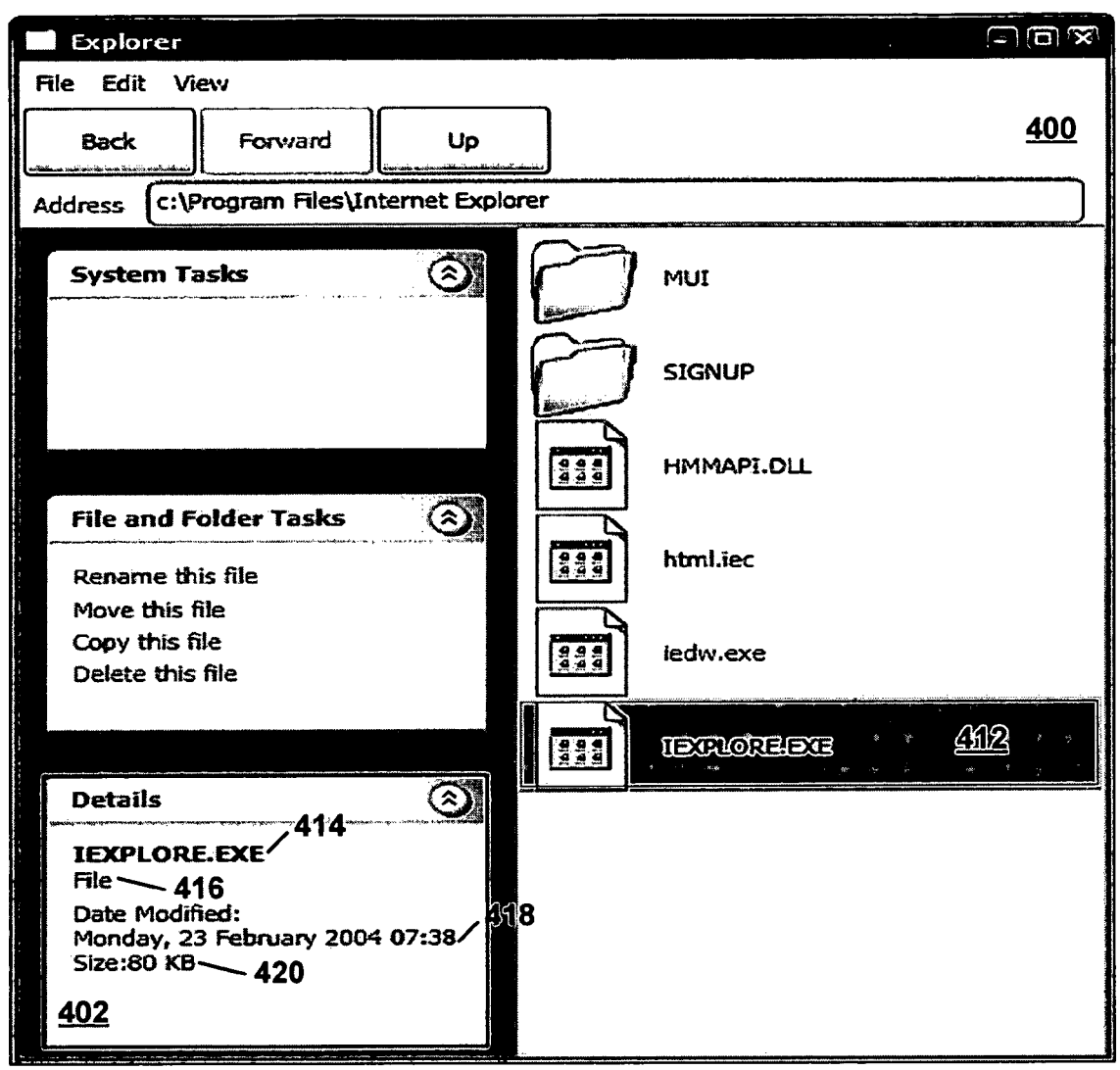
Figure 4C:
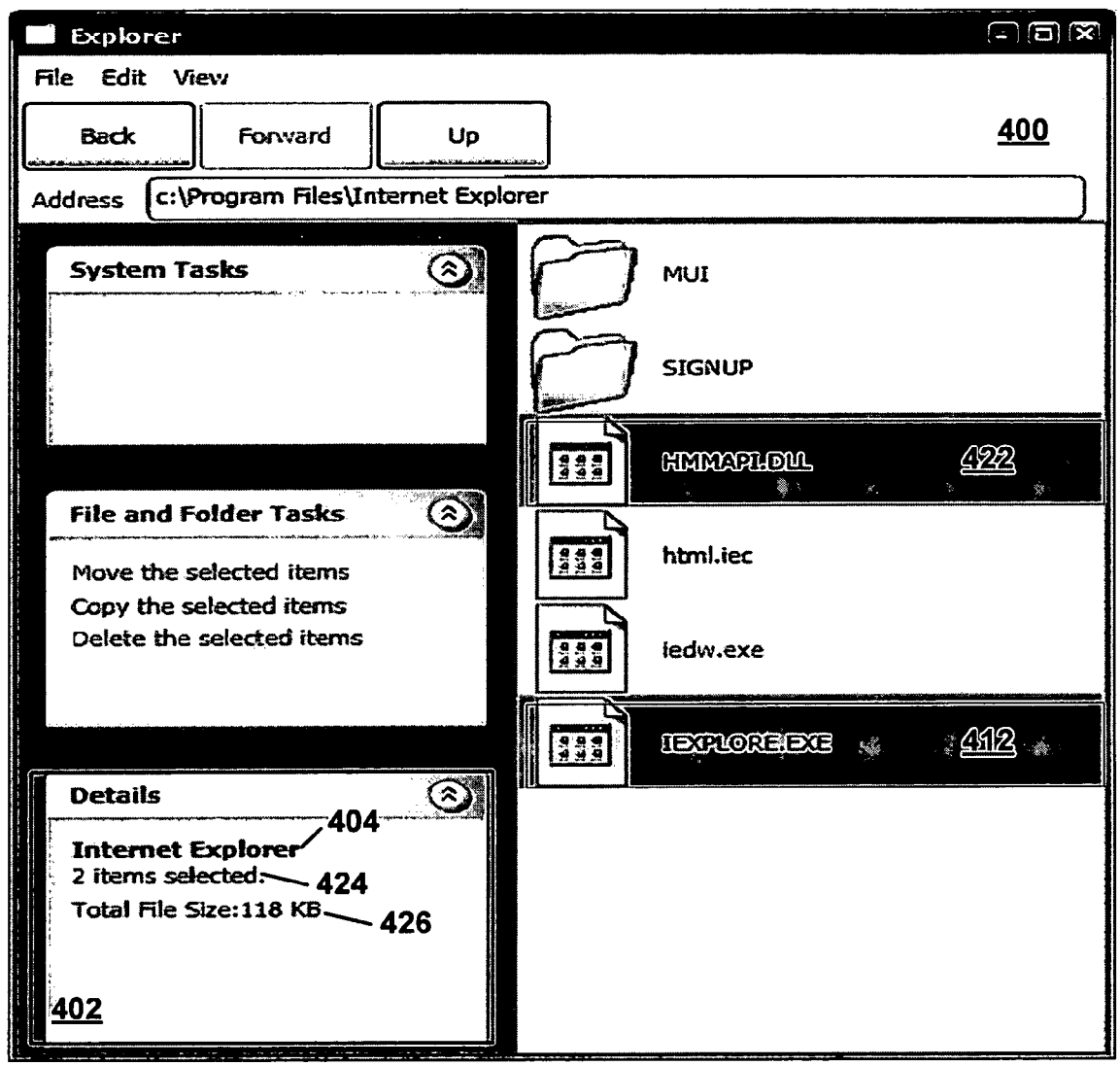

FIGS. 4*a*-*c* illustrate a series of user interfaces demonstrating possible scenarios in keeping with the above. FIG. 4*a* illustrates an exemplary UI 400 in which the file system (files and folders) is the model. The Details pane 402 displays state about the current selection. In some embodiments of the invention, what is displayed in the Details pane 402 is declaratively specified via a collection of priority binding statements in the UI definition. In some embodiments of the invention, the UI is defined via a markup language such as HTML, (Hypertext Markup Language), XML (eXtensible Markup Language), XAML (eXtensible Markup Application Language), or other suitable markup language. The text content of the Details pane 402 (corresponding to target text field 330 in FIGS. 3*a* and 3*b*) may be tied to the current selection (corresponding to Selected Item 312 of FIGS. 3*a* and 3*b*) and the current folder (Current Folder 323) by a list of priority bindings specified in the definition of the UI. The list of priority bindings may indicate that the text control is to be bound to the name of the single selection (highest priority), and if there is no single selection, the text is to be bound to the name of the current folder. The following is an exemplary specification of the above, written in XAML:

```
<Text>
    <TextContent>
        <BindingList>
            <Bind Path="Model.SelectedItem.Name"/>
            <Bind Path="Model.CurrentFolder.Name"/>
        </BindingList>
    </TextContent>
</Text>
```

Thus, when nothing is selected the Details pane 402 may display the name of the current folder 404 ("Internet Explorer").

A description of the item, ("File Folder" 406) and the modification time 408, may also be displayed by specifying a similar section of markup. For example, the text control may be bound to the description of the single selection, if something has been selected. If there is no single selection, the text may be bound to the number of selected items. If there is no selection of any kind, the text may be bound to the description of the current folder. The following is an exemplary specification of the above, written in XAML:

```
<Text>
    <TextContent>
        <BindingList>
            <Bind Path="Model.SelectedItem.Description"/>
            <Bind Path="Model.SelectedItems.SelectionCount"/>
            <Bind Path="Model.CurrentFolder.Description"/>
        </BindingList>
    </TextContent>
</Text>
```

In FIG. 4*a*, because there is no selected item, neither of the first two binding statements evaluates. However, the third binding statement evaluates successfully so the current folder description ("File Folder") evaluates so "File Folder" is displayed in text field 406. FIG. 4*b* illustrates the exemplary UI 400 of FIG. 4*a* after a single item has been selected. In FIG. 4*b* the item "IEXPLORE.EXE" 412 has been selected. The item "IEXPLORE.EXE" 412 corresponds to the Selected Item 312 of FIGS. 3*a* and 3*b*.

The Details pane 402 now displays the name of the selected item ("IEXPLORE.EXE" 414), a description ("File" 416). The text control may also be bound to the file size of the single selection. If there is no single selection, the text may be bound to the total file size exposed by the set of selected items. If there is no selection of any kind, the text may take on the default value for that control type—an empty string. The following is an exemplary specification of the above, written in XAML:

```
<Text>
    <TextContent>
        <BindingList>
            <Bind Path="Model.SelectedItem.FileSize"/>
            <Bind Path="Model.SelectedItems.TotalFileSize"/>
        </BindingList>
    </TextContent>
</Text>
```

Hence, in FIG. 4*b*, because an item has been selected, the file size 420 is displayed. A similar block of markup could be specified to display the modification time 418.

FIG. 4*c* illustrates the exemplary UI 400 of FIG. 4*a* after multiple items have been selected. In FIG. 4*c*, the items "HMMAPI.DLL" 422 and "IEXPLORE.EXE" 412 have been selected. In this case, Details pane 402 displays the name of the folder ("Internet Explorer") 404 rather than the names of the selected items, a description displaying the number of items selected 424 and the total file size 426. No modification time is displayed.

In some embodiments of the invention, a number of items may be selected, exposed as a single collection of items including all of the selected items (perhaps of type "collection" rather than type "file", etc. If something were added or removed from the collection of items, a change notification would be sent and updates made by the binding engine.

In some embodiments of the invention, a default value is used if no binding is valid. A literal value may be specified in the UI definition. The literal value will be applied to the target if the search through the priority bindings list does not find a binding statement that evaluates successfully. For example, if none of the binding statements for the description field can be evaluated successfully, the text control may use the specified fallback value ("No description available") instead. The following is an exemplary specification of the above, written in XAML:

```
<Text>
    <TextContent>
        <BindingList>
            <Bind Path="Model.SelectedItem.Description"/>
            <Bind Path="Model.SelectedItems.SelectionCount"/>
            <Bind Path="Model.CurrentFolder.Description"/>
            <Default Text="No description available"/>
        </BindingList>
    </TextContent>
</Text>
```

In some embodiments of the invention, the priority binding mechanism evaluates an optional expression for each binding statement to provide additional flexibility. For example, an expression that provides an alternative approach for the name field example in the file system UI Details Pane of FIGS. 4a-c may be specified. Suppose the field is to be bound to the name of the selected item if there is only one item in the selection, or to the name of the current folder otherwise. The following group of statements may specify such a result:

```
<Text>
    <TextContent>
        <BindingList>
            <Bind Path="Model.SelectedItems[0].Name">
                <Expression>
                    <Property>
                        <Bind Path="Model.SelectedItems.Count"/>
                    </Property>
                    <Value>1</Value>
                </Expression>
            </Bind>
            <Bind Path="Model.CurrentFolder.Name"/>
        </BindingList>
    </TextContent>
</Text>
```

In that case, suppose two items are selected. Although SelectedItems would contain a zero-th item and that item may have a Name property, the expression in the binding statement 1 would fail since SelectedItems.Count would not equal 1. Consequently binding statement 1 would not evaluate successfully and binding statement 2:
<Bind Path="Model.CurrentFolder.Name"/>
is evaluated, as described above with respect to binding statement 1.

Figure 5:
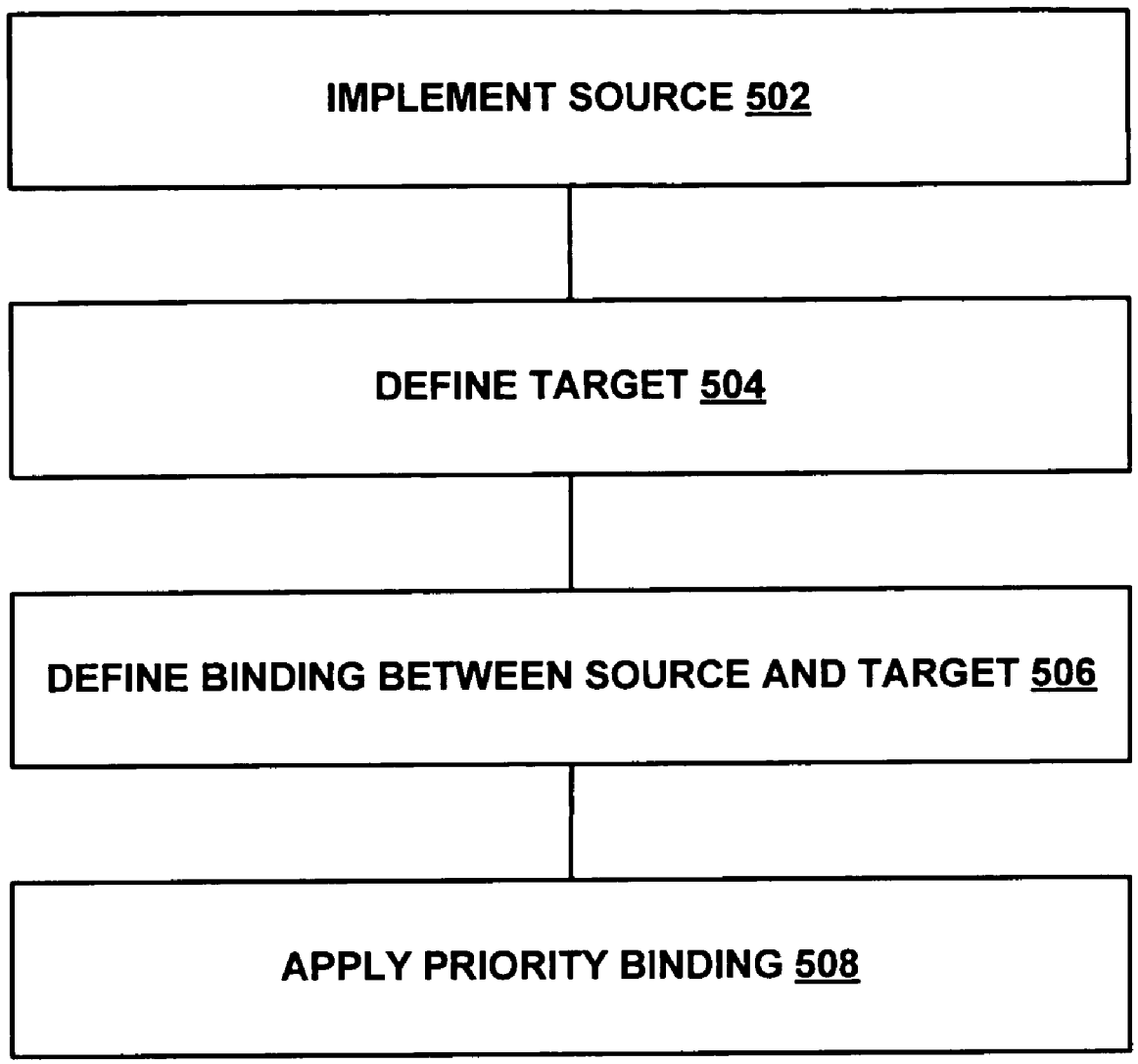
FIG. 5 is a flow diagram of an exemplary method of priority binding in accordance with one embodiment of the invention.

FIG. 5 illustrates an exemplary flow diagram for a method of specifying and executing priority bindings in accordance with one embodiment of the invention. One or more steps of the method may be optional. In FIG. 5, at step 502 a source definition is received. This may involve the coding and/or instantiation of a model or application. For example, a developer may implement the model, exposing one or more properties to be bound to. At step 504, a target definition is received. This may involve the specification in code or markup of a target such as a user interface and/or the instantiation of the user interface. For example, a designer may create a user interface in a markup language or a developer may create a user interface in code. At step 506 a collection of one or more binding statements may be received, indicating an order or priority of execution. In some embodiments of the invention, the priority order is indicated by the order of the statements, that is the first binding statement in the list of statements is the highest priority statement, the second binding statement in the list of statements is the second highest priority statement and so on. Alternatively, priority of execution may be indicated by a marker or indicator associated with the binding statement or by any other suitable means. For example, priority of execution may be indicated by the sequence of the binding statements as presented from top to bottom or from bottom to top. Other suitable means of indicating priority are contemplated. In some embodiments of the invention, the specification of the binding statements may be incorporated into definition of the target (step 504). This may involve the coding of data connections between target and source (e.g., by a developer) or the specification of a collection of one or more binding statements in markup (e.g., by a designer) as described above.

At step 508, the application comprising the model and the user interface may be generated and/or instantiated. A binding engine may listen on the paths of the model and execute the collection of data binding statements in priority order, that is, the highest priority statement that evaluates successfully is executed, thus synchronizing target and model as described above. In some embodiments of the invention, binding statements are evaluated in priority execution order, although binding statements may be evaluated in random sequence, from the point of the currently executing statement, in an indicated evaluation order, or other suitable order.

Figure 6:
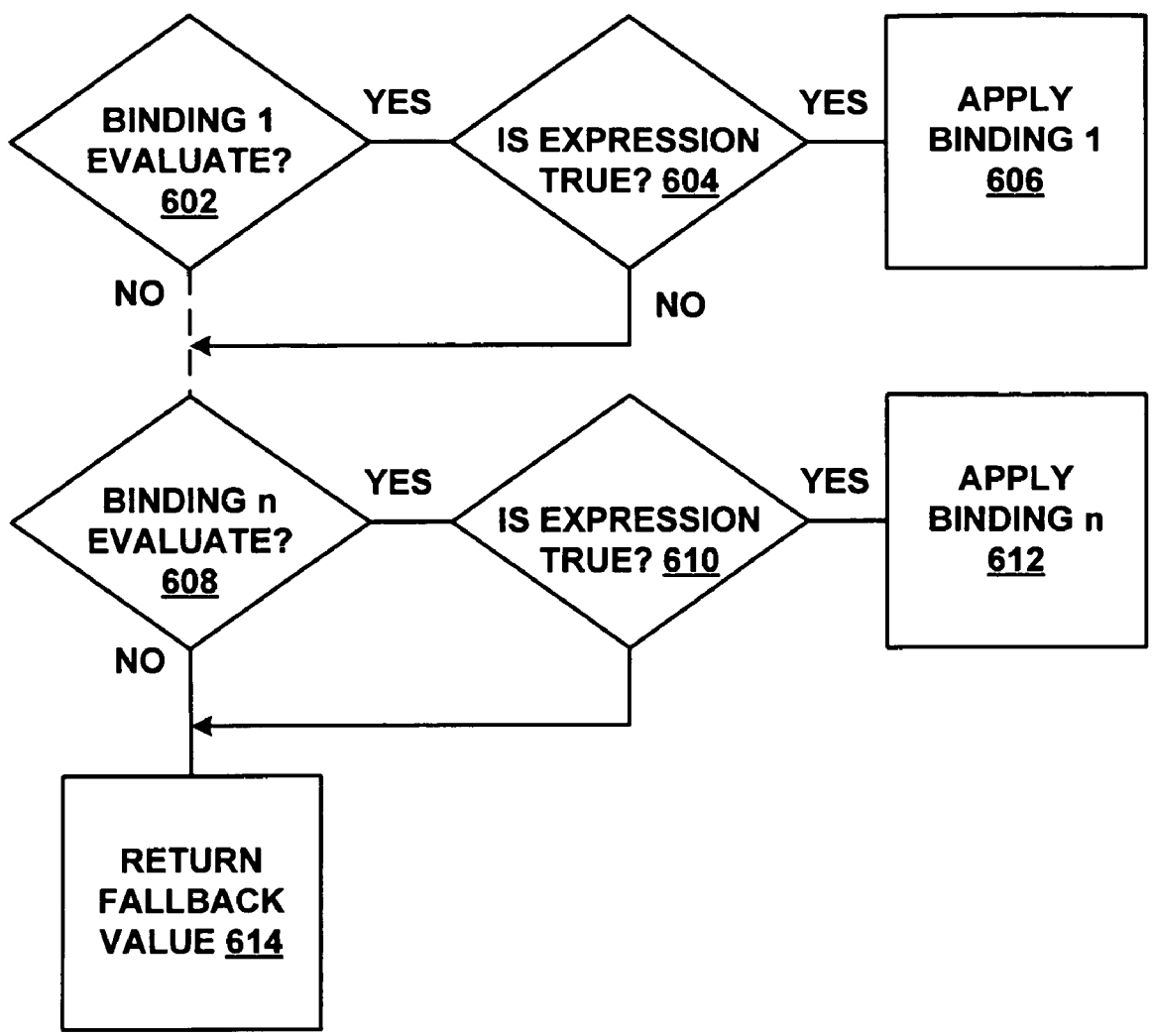
FIG. 6 is a flow diagram of an exemplary method of evaluating a list of priority binding statements in accordance with one embodiment of the invention.

FIG. 6 is a flow diagram illustrating the evaluation of the collection of binding statements as described above. At step 602, a binding statement is evaluated. If it evaluates successfully, and the expression is true (step 604, optional) the value of the object is applied in step 606. If the binding statement does not evaluate successfully, the next binding statement (if present) is evaluated (step 608). If the next binding statement evaluates successfully and the expression is true (step 610, optional), the value indicated by the binding statement is applied in step 612. If the next binding statement does not evaluate successfully, the next binding statement (if present) is evaluated. These steps are repeated until all the binding statements in the collection of statements are evaluated. The binding statements may be evaluated in priority order or in any other order, as discussed above. The highest priority binding statement that evaluates successfully (and for which the associated expression, if any, is true) is executed. If all of the binding statements in the collection of statements are evaluated and none evaluates successfully, and a fallback value is specified (step 614, optional), the fallback value may be used to update the target. If no fallback statement is provided, the target value may be left unset, the value may be cleared, or the value may be set to a default value.

Referring again to FIG. 3b and FIG. 4b, suppose binding statement 1 is:
<Bind Path="Model.SelectedItem.Name"/>
At step 602, the bind path "Model.SelectedItem.Name" may be evaluated. The object graph may be queried and the following may be determined:
In the data source, model, does a SelectedItem property exist?

If so, is the object value not null?
If so, does the object have a "Name" property?
If so, is there an expression defined?
If so, evaluate the expression. Does the expression evaluate correctly?
If so, apply the binding.
If not, the binding evaluation fails.

In the above example, a SelectedItem property on the model exists, and has a name property, (IEXPLORE.EXE), there is no expression and so binding statement 1 is applied and IEXPLORE.EXE is returned to display in the UI text field. It will be understood that this set of steps may be repeated for each binding statement evaluated until the binding statement of the highest priority that evaluates successfully is found.

The binding engine may monitor for a change notification. For example if a change notification was sent from object 316, the binding statements would be re-evaluated to determine the highest priority statement.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for binding target and source comprising:
a computer that stores a plurality of binding statements used to determine content to be displayed in a user interface during execution of user interface software by the computer, the plurality of binding statements specified by declarative statements, the plurality of binding statements comprising at least a first binding statement and a second binding statement;
a binding engine executing on the computer, the binding engine establishing a priority order in which the plurality of binding statements are to be executed by the computer in order to bind the target to the source, the execution priority order being established using a priority indicator or marker associated with each of the plurality of binding statements, the binding engine evaluating the plurality of binding statements to determine content to be displayed in a user interface during execution of the user interface software by the computer,
whereby executing the binding statements according to the priority order enables efficient generation of the user interface.

2. The system of claim 1 wherein the first binding statement is associated with a first priority and the second binding statement is associated with a second priority.

3. The system of claim 2, wherein in response to determining that the first priority is higher than the second priority, the first binding statement is evaluated.

4. The system of claim 3, wherein in response to determining that the first binding statement evaluates successfully, the first binding statement is executed.

5. The system of claim 2, wherein the execution priority comprises:
in response to determining that the first priority is a highest priority and the second priority is a next highest priority and the first binding statement does not evaluate successfully and the second binding statement evaluates successfully, executing the second binding statement.

6. The system of claim 1, wherein the first binding statement comprises a data source.

7. The system of claim 6, wherein the data source comprises an object accessed via a URI.

8. The system of claim 6, wherein the data source comprises an XML source.

9. The system of claim 6, wherein the data source comprises an object model.

10. The system of claim 6, wherein the data source comprises a database accessed by a database query language.

11. The system of claim 1, wherein the first binding statement comprises a binding path.

12. The system of claim 11, wherein the binding path is expressed as an XML XPath.

13. The system of claim 11, wherein the binding path comprises an object path.

14. The system of claim 1, wherein the first binding statement comprises an expression.

15. The system of claim 14, wherein determining that the first binding statement evaluates successfully comprises determining that the expression evaluates to true.

16. The system of claim 1, wherein the second binding statement comprises a default value and the default value is used to update a target when only the second binding statement evaluates successfully.

17. A method implemented by a computer for binding a target to at least two of a plurality of data elements comprising:
storing a plurality of binding statements specified by declarative statements provided during program development of user interface software, comprising at least a first binding statement and a second binding statement, wherein a binding engine evaluates the plurality of binding statements to determine content to be displayed in a user interface during execution of the user interface software by the computer;
receiving a priority order indicating an order of execution of the plurality of binding statements, the first binding statement associated with a highest priority and the second binding statement associated with a next highest priority, the priority order being established using a priority indicator associated with each of the plurality of binding statements;

evaluating the higher priority first binding statement;
executing the first binding statement if the evaluation is successful; and
automatically evaluating the second binding statement if the first binding statement fails the evaluation;
wherein the evaluation of the first and second binding statements is performed by the binding engine; and
displaying a fallback value in the user interface if both the first and second binding statements fail to evaluate successfully,
whereby executing the binding statements according to the priority order enables efficient generation of the user interface.

18. The method of claim 17, wherein executing the first binding statement comprises updating a target with a data element identified by the first binding statement.

19. The method of claim 17, wherein in response to determining that the first binding statement does not evaluate successfully, automatically evaluating the second binding statement.

20. The method of claim 19, wherein in response to successfully evaluating the second binding statement, executing the second binding statement.

21. The method of claim 19, wherein the second binding statement comprises a default value and the default value is used to update a target.

22. The method of claim 17, wherein the plurality of binding statements is defined via a markup language.

23. The method of claim 22, wherein the markup language is HTML, XML or XAML.

24. The method of claim 17, wherein the first binding statement comprises an expression value.

25. The method of claim 24, wherein the first binding statement is executed in response to determining that the first binding statement evaluates successfully and the first binding statement expression evaluates to true.

26. The method of claim 17, wherein the target is an element of a user interface.

27. The method of claim 17, further comprising monitoring a plurality of data binding paths associated with the plurality of binding statements for a change notification.

28. The method of claim 27, farther comprising re-evaluating the plurality of binding statements in response to receiving the change notification.

29. A computer-readable storage device comprising computer-executable instructions for:
mapping a target to at least a first data element and a second data element of a plurality of data elements of a source using a collection of binding statements used to determine content to be displayed in a user interface during execution of user interface software by a computer, the plurality of binding statements in a declarative markup language, wherein the collection of binding statements are provided during program development of a user interface;
evaluating the collection of binding statements with a priority data binding engine for binding the target using a priority protocol to determine which one of the binding statements to use to determine content to be displayed in the user interface during execution of the user interface by a computer; and
displaying a fallback value in the user interface if the collection of binding statements fail to evaluate successfully,
whereby executing the binding statements according to the priority order enables efficient generation of the user interface 30. The computer-readable storage medium of claim 29, further comprising computer-executable instructions for indicating an execution order for the collection of binding statements.

31. The computer-readable storage medium of claim 30, further comprising computer-executable instructions for specifying that the collection of binding statements comprises a first binding statement associated with the first data element and a first execution order indicating a highest priority and a second binding statement associated with the second data element and a second execution order indicating a second highest priority.

32. The computer-readable storage medium of claim 31, further comprising: computer-executable instructions for evaluating the first binding statement and in response to determining that the first binding statement evaluates successfully, executing the first binding statement.

33. The computer-readable storage medium of claim 32, further comprising computer-executable instructions for updating the target with a value of the first data element.

34. The computer-readable storage medium of claim 31, further comprising computer-executable instructions for monitoring the first data element and the second data element for a change notification and in response to detecting the change notification, re-evaluating the collection of binding statements.

35. The computer-readable storage medium of claim 31, further comprising computer-executable instructions for determining that the first binding statement does not evaluate successfully, and in response, evaluating the second binding statement.

36. The computer-readable storage medium of claim 35, further comprising computer-executable instructions for evaluating the second binding statement and in response to determining that the second binding statement evaluates successfully, executing the second binding statement.

* * * * *